United States Patent [19]

Kayano et al.

[11] Patent Number: 5,282,385

[45] Date of Patent: Feb. 1, 1994

[54] HOT-WIRE TYPE FLOWMETER

[75] Inventors: Hisashi Kayano, Nagoya; Tomokazu Kondo, Kariya; Yukio Sawada, Anjo, all of Japan

[73] Assignee: Nippondenso Co., Ltd., Kariya, Japan

[21] Appl. No.: 705,813

[22] Filed: May 29, 1991

[30] Foreign Application Priority Data

May 30, 1990 [JP] Japan .................................. 2-141027
Apr. 25, 1991 [JP] Japan .................................. 3-095290

[51] Int. Cl.$^5$ .............................................. G01F 1/68
[52] U.S. Cl. .............................. 73/204.27; 73/118.2; 73/202.5; 338/312
[58] Field of Search ........... 73/204.23, 204.25, 204.27, 73/118.2, 202.5, 204.21; 338/25, 302, 303, 312, 313, 318

[56] References Cited

U.S. PATENT DOCUMENTS

| | | |
|---|---|---|
| 652,504 | 6/1900 | Bennett .......................... 338/312 X |
| 3,314,290 | 4/1967 | Peranlo . |
| 4,393,697 | 7/1983 | Sato et al. . |
| 4,513,615 | 4/1985 | Sato et al. . |
| 4,709,581 | 12/1987 | Nishimura et al. . |
| 4,739,651 | 4/1988 | Smith . |
| 4,909,079 | 3/1990 | Nishimura et al. .............. 338/25 X |
| 5,209,113 | 5/1993 | Sawada et al. . |

FOREIGN PATENT DOCUMENTS

| | | |
|---|---|---|
| 55-48614 | 4/1980 | Japan . |
| 59115501 | 7/1981 | Japan . |
| 56-163668 | 12/1981 | Japan . |
| 57-64901 | 4/1982 | Japan . |
| 57-105551 | 7/1982 | Japan . |
| 59-151020 | 8/1984 | Japan . |
| 62-127632 | 6/1987 | Japan . |

Primary Examiner—Herbert Goldstein
Attorney, Agent, or Firm—Cushman, Darby & Cushman

[57] ABSTRACT

A hot-wire type flowmeter for measuring a flow rate of a fluid in a passage comprises a pair of support pins extending in parallel with an axis of the passage and an electrical resistor supported between the support pins in the passage. The resistor includes a pipe made of an electrically insulating material, a resistor wire wound on the pipe, and a pair of lead wires. The lead wires are secured to opposite end portions of the pipe and extend in opposite directions and in parallel to each other. The resistor is supported by the support pins through the lead wires.

15 Claims, 10 Drawing Sheets

HOT-WIRE TYPE FLOWMETER

BACKGROUND OF THE INVENTION

The present invention relates to a hot-wire type flowmeter which is suitable for use in measuring intake air flow rate in an internal combustion engine.

Flow rate measuring systems are known in which flow rate of a fluid in a main passage is determined by sensing the flow rate in a by-pass passage through which a part of fluid flowing in the main passage flows at the predetermined ratio. This type of system is disclosed, for example, in Japanese Patent Unexamined Publication No. 57-105551, Japanese Utility Model Unexamined Publication No. 56-163668 and U.S. Pat. No. 4,709,581.

In this type of flow rate measuring system having a by-pass passage, the by-pass passage rejoins the intake passage at the narrowest portion of a restriction or orifice provided in the intake passage. Therefore, air is introduced into the by-pass passage, an amount of which corresponds to the air flow in the intake passage, by virtue of the pressure difference generated in the restriction in the intake passage.

Meanwhile, Japanese Unexamined Publication No. 55-48614 discloses a hot-wire type flowmeter in which flow velocity of fluid is measured by making use of the fact that a quantity of heat transferred from a heated electrical resistor wire to the flowing fluid is varied in accordance with the flowing velocity of the fluid.

Electrical resistors for use in hot-wire type flowmeters of the kind described are disclosed, for example, in Japanese Patent Unexamined Publication No. 59-104513, Japanese Patent Unexamined Publication No. 59-151020 and U.S. Pat. No. 4,793,176. These electrical resistors generally have a pipe made of, for example, ceramics, and a platinum wire wound around the pipe and connected at its both ends to lead wires which extend axially through an axial bore in the pipe.

In this type of electrical resistor, both end portions of the platinum wire are beyond both longitudinal end edges of the pipe so as to be connected to the lead wires. The platinum wires tends to slip on these edges and, hence, is liable to be cut, resulting in an inferior productivity In general, a hot-wire type flowmeter of the type exhibits a higher sensitivity or quicker response to a change in the fluid flow rate or temperature when the heat insulation between the electrical resistor which is to be hot and the associated members of normal temperature is enhanced. Elongating the lead wires on both ends of the electrical resistor is an effective measure for enhancing the above-mentioned heat insulation. As a matter of practice, however, the length of the lead wires is limited because the size of the fluid passage in the flowmeter is limited and because the electrical resistor has to be disposed perpendicular to the flow of fluid in such a restricted passage.

Japanese Patent Unexamined Publication No. 59-104513 discloses an electrical resistor in which lead wires are orthogonally bent to have greater length. This arrangement, however, impairs the mechanical strength of the lead wires.

Japanese Patent Unexamined Publication No. 62-127632 discloses a hot-wire type flowmeter in which an electrical resistor is connected between a pair of lead lines which extend along the fluid passage, in such a manner that the electrical resistor extends across the path of the fluid in the fluid passage. This flowmeter also is impractical because its construction is complicated.

SUMMARY OF THE INVENTION

Accordingly, an object of the present invention is to overcome the above-described problems of the prior arts.

Another object of the present invention is to provide a hot-wire type flowmeter which is improved both in producibility and responsibility.

Still another object of the present invention is to provide a hot-wire type flowmeter which allows an electrical resistor and the lead wires to be disposed perpendicular to the flow of the fluid while enabling the lead wires to have a greater length, thereby improving both the producibility and the responsibility.

Further, an object of the present invention is to provide a simple process for producing an electrical resistor used in a hot-wire type flowmeter.

According to one aspect of the present invention an electrical resistor is supported in a fluid passage by means of a supporting structure, through lead wires which are secured to both end portions of a pipe of the resistor so as to cross the axis of the pipe. With this arrangement, the resistor wire wound on the pipe can be connected to the lead wires without extending beyond the longitudinal end edges of the pipe, thus eliminating any risk for the resistor wire to be cut. In addition, the lead wires are allowed to have a greater length than in known resistors, by virtue of the fact that the lead wires are arranged to cross the axis of the pipe. This offers a greater heat insulation between the pipe and the resistor wire which are held at high temperatures and the supporting structure which are held at lower temperature. As a consequence, the influence of the temperature of the supporting structure on the temperatures of the pipe and the resistor wire is diminished, so that the responsibility of the flowmeter is improved.

According to another aspect of the present invention, an electrical resistor is supported in a fluid passage by means of a pair of support pins through lead wires. The electrical resistor has a pipe made of an electrically insulating material and a resistor wire wound on the pipe. One end of each lead wire is secured to the pipe so as to cross the axis of the pipe and is electrically connected to the resistor wire. With this arrangement, the resistor wire wound on the pipe can be connected to the lead wires without extending beyond the longitudinal end edges of the pipe, thus eliminating any risk for the resistor wire to be cut. In addition, the lead wires are allowed to have a greater length than in known resistors, by virtue of the fact that the lead wires are arranged to cross the axis of the pipe. This offers a greater heat insulation between the pipe and the resistor wire which are held at high temperatures and the supporting structure which are held at lower temperature. As a consequence, the influence of the temperature of the supporting structure on the temperatures of the pipe and the resistor wire is diminished, so that the responsibility is improved.

According to still another aspect of the present invention, a by-pass passage is formed in a central member which is disposed substantially at the center of a fluid passage, and an electrical resistor is supported in the by-pass passage. Therefore, the temperature of the wall of the central member is maintained at a level close to the temperature of the fluid in the fluid passage, thus reducing any influence of the temperature outside the fluid passage. The electrical resistor is supported, through a pair of lead wires, between a pair of support pins which projects from a terminal end wall of a straight cylindrical portion which forms a part of the by-pass passage. The electrical resistor has a piep made from an electrically insulating material and a resistor wire wound on the pipe. One end of each lead wire is secured to the pipe so as to cross the axis of the pipe and is electrically connected to the resistor wire. With this arrangement, the resistor wire wound on the pipe can be connected to the lead wires without extending beyond the longitudinal end edges of the pipe, thus eliminating any risk for the resistor wire to be cut. In addition, the lead wires are allowed to have a greater length than in known resistors, by virtue of the fact that the lead wires are arranged to cross the axis of the pipe. This offers a greater heat insulation between the pipe and the resistor wire which are held at high temperatures and the supporting structure which are held at lower temperature. As a consequence, the influence of the temperature of the supporting structure on the temperatures of the pipe and the resistor wire is diminished, so that the responsibility of the flowmeter are improved.

Further, according to an aspect of the present invention, a pipe blank is cut into some segments, each including a pair of lead wires, after the lead wires are secured to the pipe blank. The lead wires extend to cross an axis of the pipe blank. Therefore, the cutting of the pipe blank is readily taken place without interference of the lead wires. Accordingly, an electrical resistor having a longer lead wire can be readily obtained.

DETAILED DESCRIPTION OF THE PREFERRED EMBODIMENTS

Figure 1:
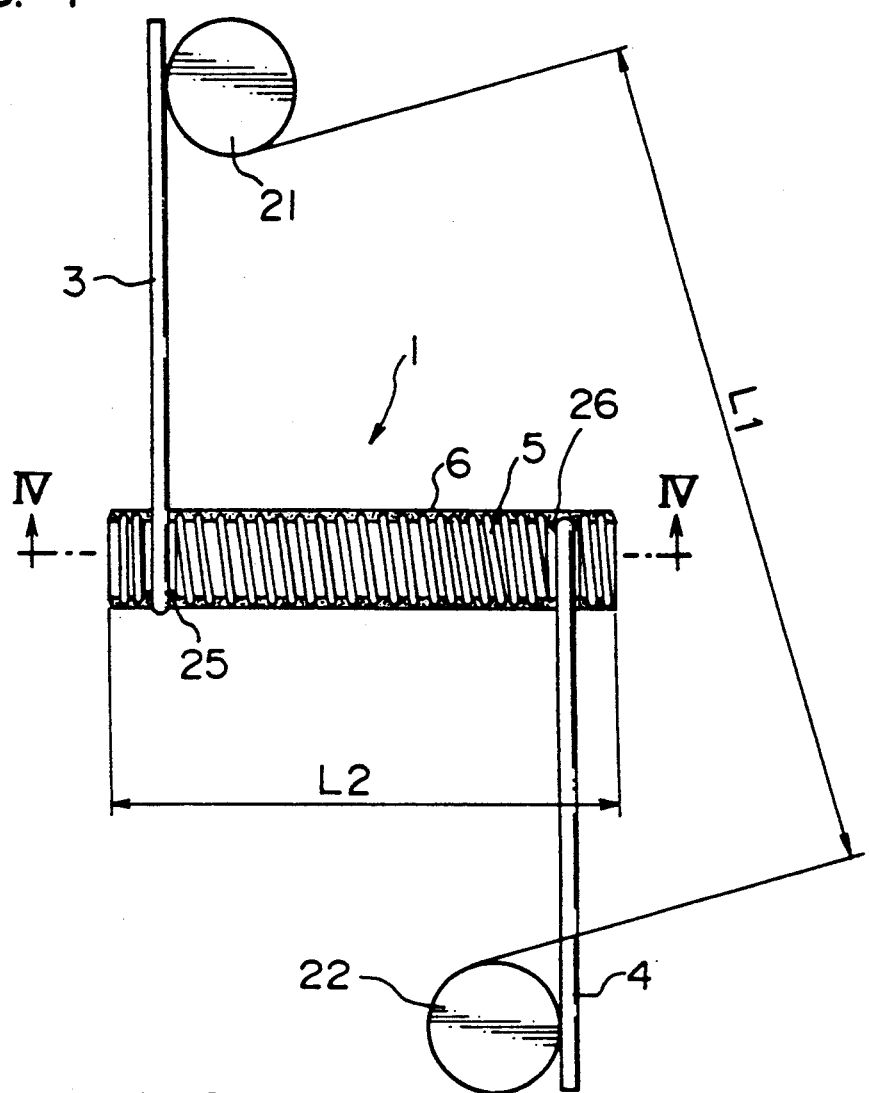
FIG. 1 is a plan view of a heat generating resistor which is used in a first embodiment of a hot-wire type flowmeter shown in FIG. 2.
Figure 2:
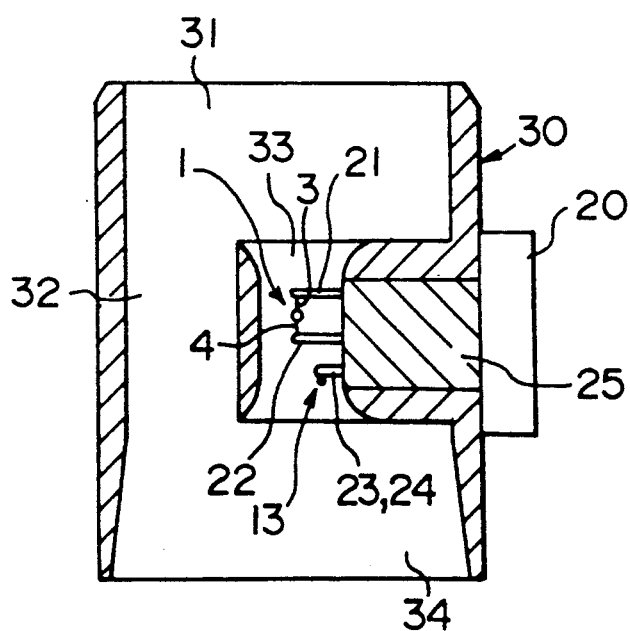
FIG. 2 is a sectional view of the first embodiment of the hot-wire type flowmeter in accordance with the present invention.

FIG. 1 shows a heat-generating resistor 1 which is incorporated in a first embodiment of hot-wire type flowmeter of the present invention shown in FIG. 2.

Figure 3:
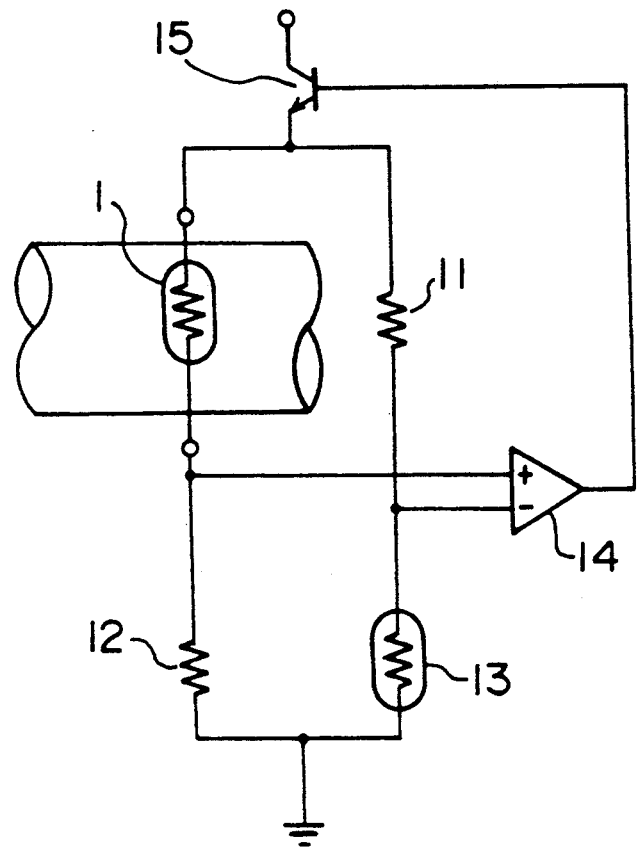
FIG. 3 is a circuit diagram of an electrical circuit incorporated in the first embodiment of the flowmeter.

As will be seen from FIG. 3, the heat-generating resistor 1 cooperates with resistors 11, 12 and 13 to form a bridge circuit. A feed back circuit is provided to drive a transistor 15. In the feed back circuit, a differential amplifier 14 amplifies a voltage difference in the bridge circuit and outputs an amplified voltage so as to drive the transistor 15. The voltage difference is taken as an output signal which represents a flow rate of fluid passing through a fluid passage. Referring to FIG. 2, the heat-generating resistor 1 is disposed in the fluid Passage together with a temperature compensation resistor 13 and is controlled by the above-mentioned feedback circuit such that its temperature is maintained higher by a predetermined level, e.g., about 100° C., from the ambient temperature. A driving circuit which includes the above-mentioned amplifier 14 and the transistor 15 is housed in a housing 20. The resistors 1 and 13 are respectively supported by pins 21, 22 and pins 23, 24 and are mounted is a holder 25, which is molded together with the above-mentioned pins 21, 22, 23, 24. The holder 25 is secured to a chamber 30 to form a part of a wall defining an intake passage of the internal combustion engine. The chamber 30 is provided with a by-pass passage 33 which communicates with a main passage 32. The heat-generating resistor 1 and the temperature-compensation resistor 13 are positioned in the by-pass passage 33. The chamber 30 is connected at its inlet end 31 to an air cleaner (not shown) while an outlet 34 of the chamber 30 leads to combustion chambers of an internal combustion engine through a throttle valve (not shown).

Figure 4:
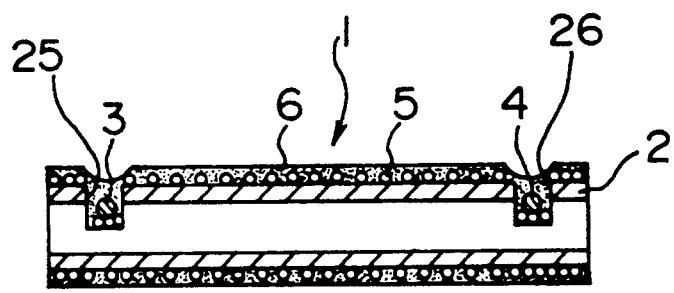
FIG. 4 is a sectional view of the heat-generating resistor shown in FIG. 1.
Figure 5:
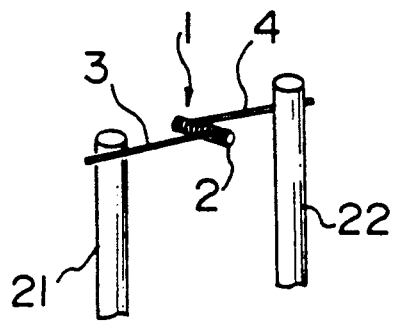
FIG. 5 is a perspective view of the heat-generating resistor shown in FIG. 1.

The heat-generating resistor 1 will be described in detail with reference to FIGS. 1, 4 and 5. A pipe 2 made of a ceramics material, e.g., alumina, as an electrically insulating material is provided at its both end portions with diametrical grooves 25 and 26. A platinum wire 5 is wound around the pipe 2. These grooves 25 and 26 receive ends of lead wires 3 and 4. These ends of the lead wires 3 and 4 are connected by, for example, welding to the platinum wire 5. The connection between the platinum wire 5 and the lead wires 3, 4 may be attained by applying a conductive paste to the connecting portions and baking the paste. The lead wires 3 and 4 extend pertendicular to an axis of the pipe 2 and in opposite directions from each other. The other ends of the lead wires 3 and 4 are connected to the ends of the support pins 21 and 22. The platinum wire 5 is covered with a protective layer 6. This protective layer 6 is formed by applying a mixture of lead glass powder and a binder and then baking it at a temperature around 600° C. The heat-generating resistor 1 is disposed such that the pipe 2 extends perpendicular to the axis of the by-pass passage 33.

In the supporting structure shown in FIG. 1, the total length of the lead wires 3 and 4 is not smaller than the difference (L1-L2) between the distance L1 between both support pins 21 and 22 and the axial length L2 of the pipe 2.

Figure 6A:
FIGS. 6A to 6F are illustration of steps of a process for producing the heat-generating resistor shown in FIG. 1.
Figure 6B:
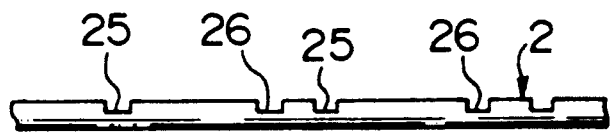
Figure 6C:
Figure 6D:
Figure 6E:
Figure 6F:

A description will now be given of a process for producing the heat-generating resistor 1, with specific reference to FIGS. 6A to 6F. As the first step of the Process, the pipe 2 is formed from the above-mentioned electrically insulating material by molding and baking, as shown in FIG. 6A. Then, grooves 25 and 26 are formed at predetermined intervals as shown in FIG. 6B. Subsequently, the platinum wire 5 is wound on the pipe 2 as shown in FIG. 6C. Then, as shown in FIG. 6D, ends of lead wires 3 and 4 are set in the grooves 25 and 26 and are welded to the platinum wire 5. A protective layer 6 is formed on the platinum wire 5 as shown in FIG. 6E. Finally, the thus-formed continuous linear structure is cut at predetermined portions, whereby independent heat-generating resistors 1 are obtained as shown in FIG. 6F.

In this embodiment, the lead wires 3 and 4 of the heat-generating resistor 1 are positioned within the grooves 25 and 26 formed in the pipe 2 so that they can be stably connected to the platinum wire 5, thus eliminating any risk of cutting of the platinum wire 5. The lead wires 3 and 4 extend perpendicular to the pipe 2, i.e., in parallel with the by-pass passage 33 (FIG. 2), so that they can have a large length despite of a small diameter of the by-pass passage 33. It is therefore possible to obtain a large heat-insulating effect between the pipe 2 which is held at a high temperature and the support pins 21 and 22 which are held at normal temperature, whereby the responsibility is improved. Furthermore, since the lead wires 3 and 4 are disposed perpendicular to the pipe 2, the described process enables production of a large quantity of heat-generating resistors, thus offering a remarkable improvement in the productivity.

Figure 7:
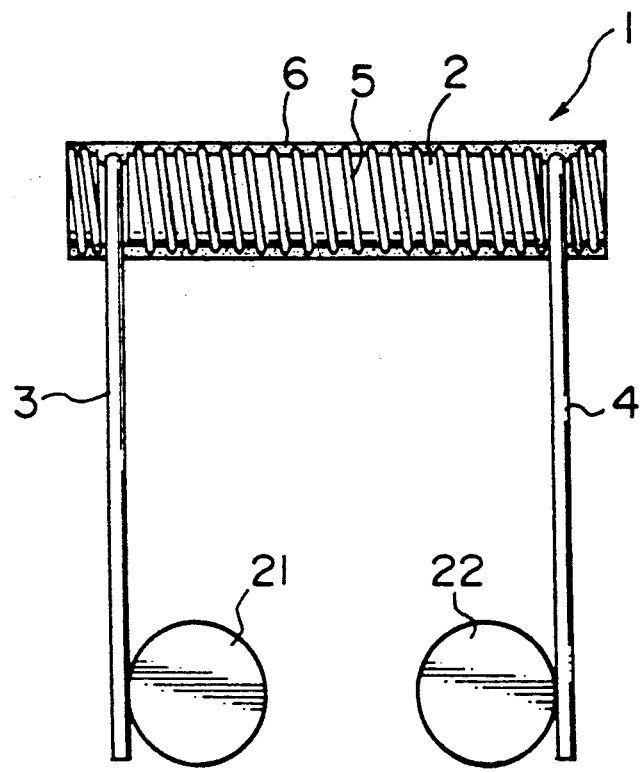
FIG. 7 is a plan view of a heat-generating resistor used in a second embodiment of the flowmeter of the present invention.
Figure 8:
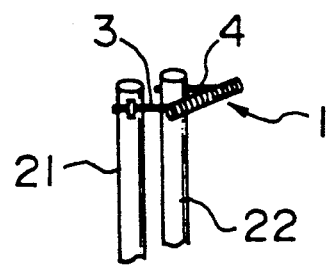
FIG. 8 is a perspective view of the heat-generating resistor shown in FIG. 7.

In the first embodiment, the lead wires 3 and 4 extend in opposite directions. However, in a second embodiment, lead wires 3 and 4 extend in the same direction and are supported by the pins 21 and 22, as shown in FIG. 7 and 8.

In the first and second embodiments as described, in the heat generating resistor 1, the ends of the lead wires 3 and 4 are disposed in the grooves 25 and 26 which are formed in both end portions of the pipe 2.

Figure 9:
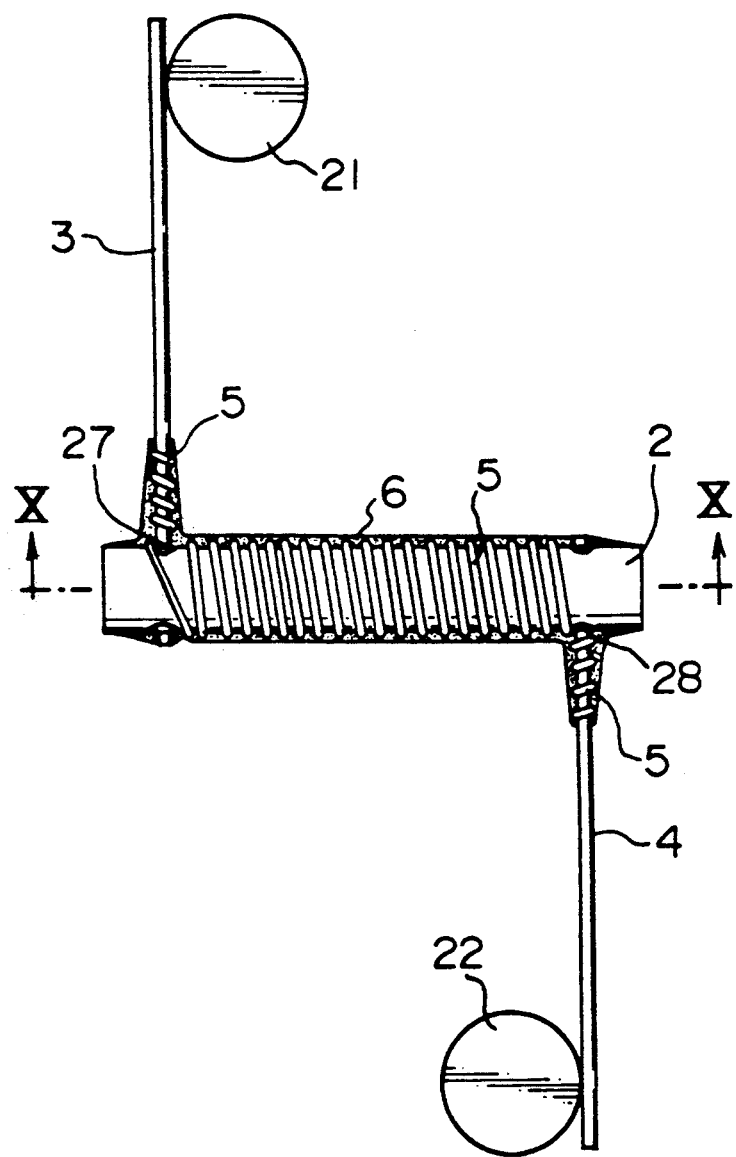
FIG. 9 is a plan view of a heat-generating resistor used in a third embodiment of the flowmeter in accordance with the present invention.
Figure 10:
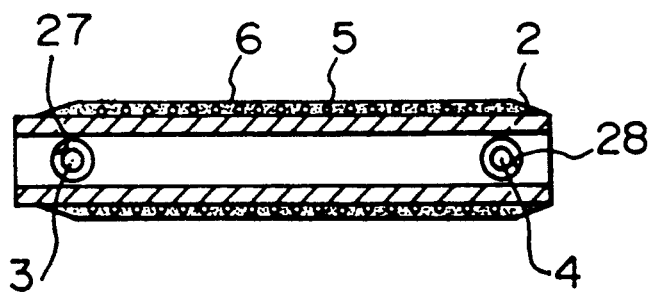
FIG. 10 is a sectional view of the heat-generating resistor shown in FIG. 9.
Figure 11A:
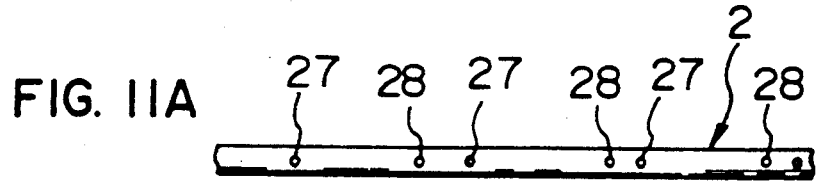
FIGS. 11A to 11E are illustrations of steps of a process for producing the heat-generating resistor shown in FIG. 9.
Figure 11B:
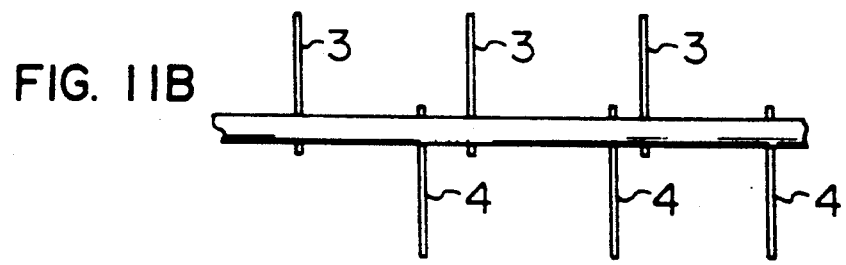
Figure 11C:
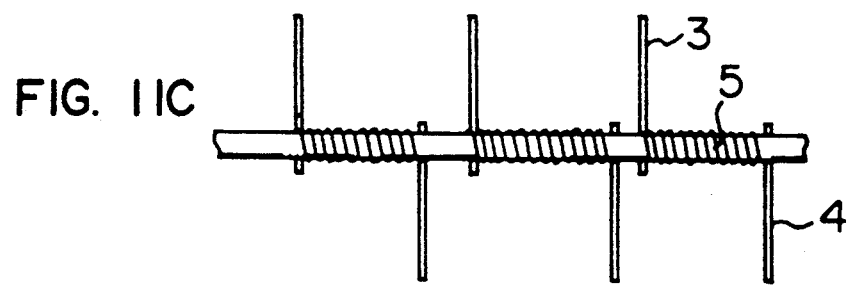
Figure 11D:
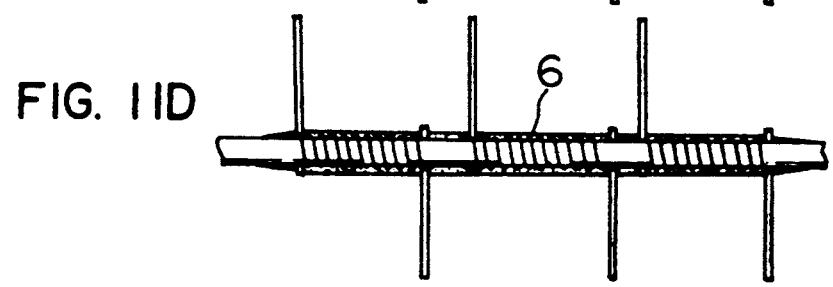
Figure 11E:
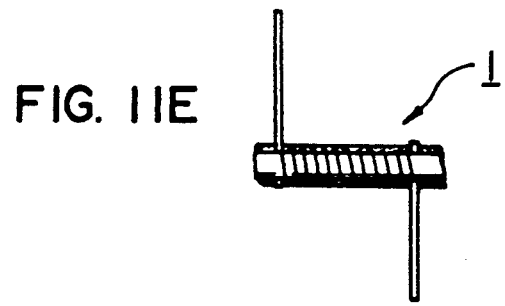

In a third embodiment of the present invention, as shown in FIGS. 9 and 10, the heat generating resistor 1 is provided with diametrical through bores 27, 28 at both end portions of the pipe 2 so as to receive ends of the lead wires 3 and 4. The platinum wire 5 is wound on the ends of the lead wires 3 and 4, thus attaining an electrical connection. This heat-generating resistor 1 is produced, for example, by the following process. In a first step, diametrical through bores 27 and 28 are formed in the pipe 2 as shown in FIG. 11A. Then, the pipe 2 is baked together with the ends of the lead wires 3 and 4 received in the through bores 27 and 28, as shown in FIG. 11B. Subsequently, the platinum wire 5 is wound on the pipe 2 and welded to the lead wires 3 and 4 as shown in FIG. 11C. Subsequently, a protective layer 6 is formed on the platinum wire 5 and the pipe 2 as shown in FIG. 11D. Finally, the long continuous blank is cut into independent heat-generating resistors 1, as shown in FIG. 11E.

Figure 12:
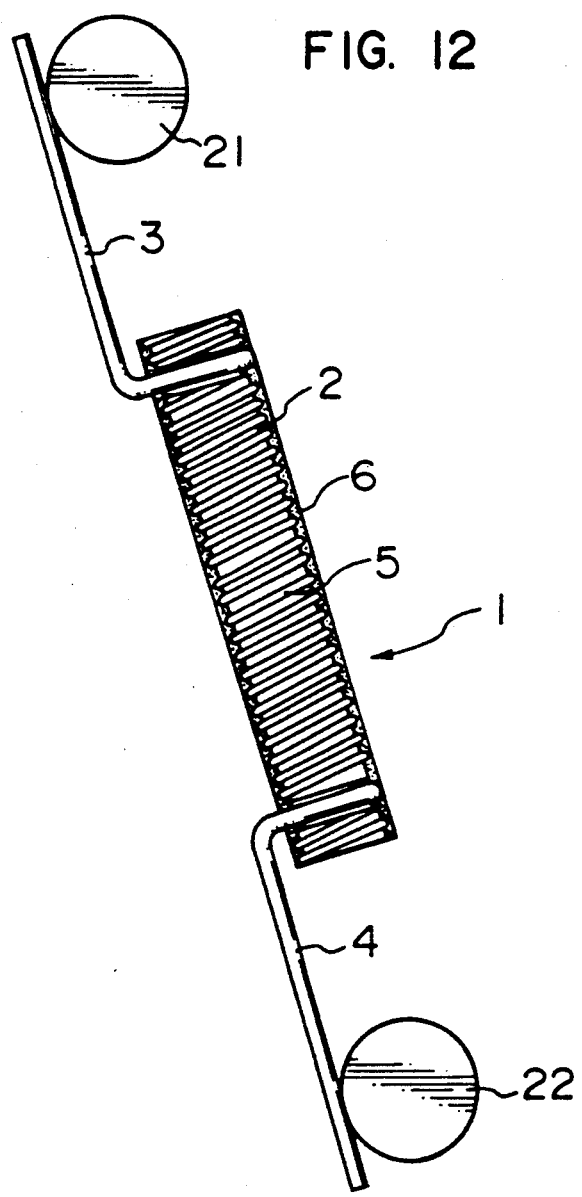
FIG. 12 is a plan view of a heat-generating resistor used in a fourth embodiment of the flowmeter in accordance with the present invention.
Figure 13:
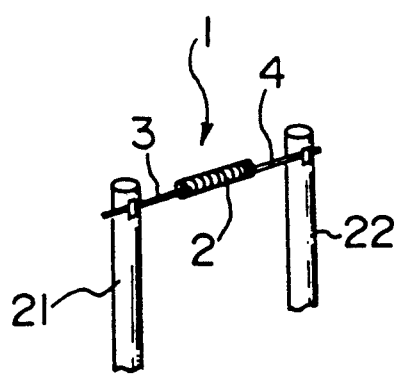
FIG. 13 is a perspective view of the heat-generating resistor shown in FIG. 12.

In a fourth embodiment, the heat generating resistor 1 is provided with lead wires 3 and 4 which are orthogonally bent in parallel to the longitudinal axis of the pipe 2 and connected to support pins 21 and 22 as shown in FIGS. 12 and 13.

Figure 14:
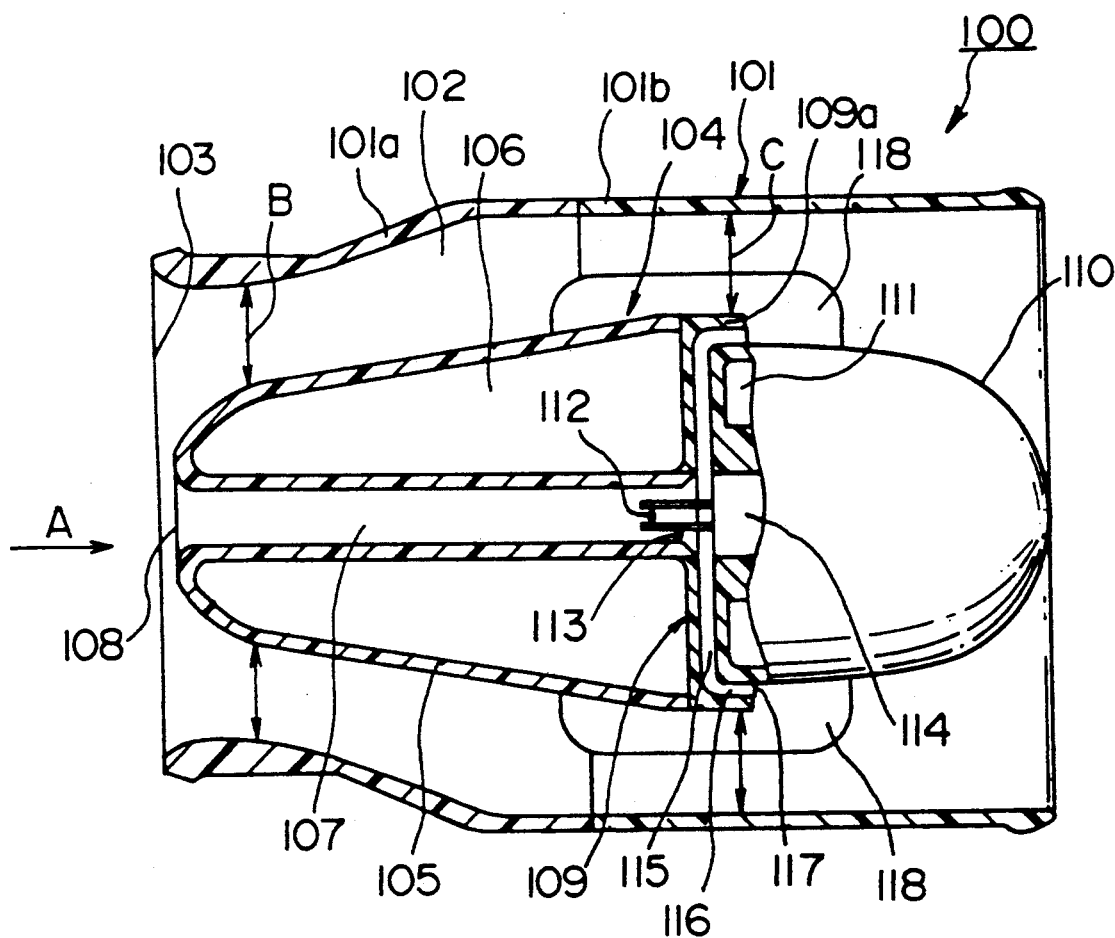
FIG. 14 is a fragmentary sectional view of a fifth embodiment of the hot-wire type flowmeter in accordance with the present invention.
Figure 15:
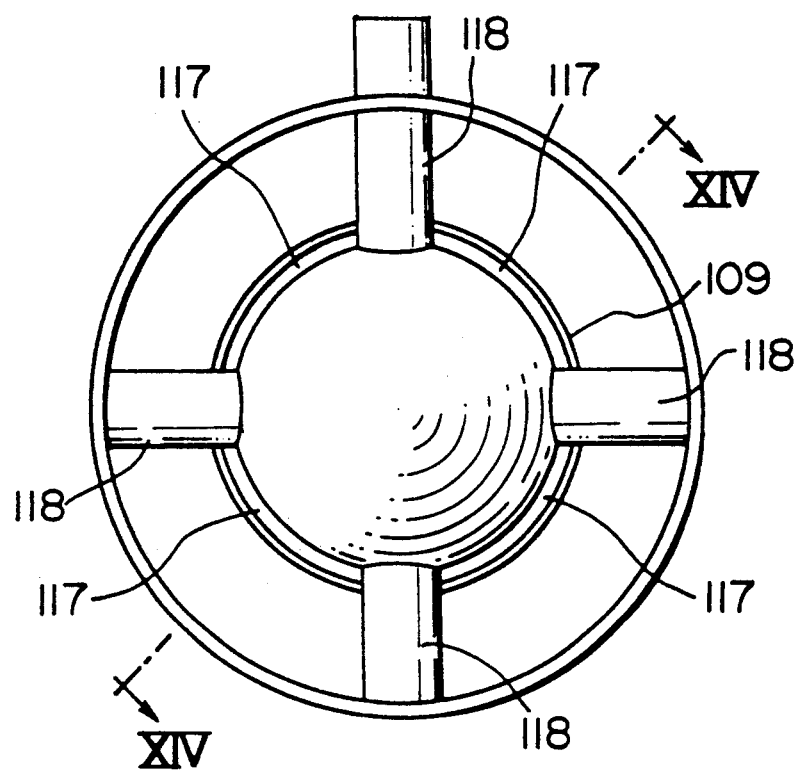
FIG. 15 is a bottom plan view of the hot-wire type flowmeter shown in FIG. 14.

Referring to FIGS. 14 and 15, a hot-wire type flowmeter 100 according to a fifth embodiment of the present invention is communicated to the downstream end of an air cleaner (not shown) through a duct. Air is introduced into the hot-wire type flowmeter 100 as indicated by an arrow A in FIG. 14. The hot-wire type flowmeter 100 is communicated at its downstream end to combustion chambers of an internal combustion engine through a throttle valve which is not shown.

The hot-wire type flowmeter 100 has a cylindrical housing 101 which defines a main passage 102, and a central member 104 which is disposed at the center of the main passage 102 in the housing 101. The housing 101 and the central member 104 are made of resin by injection molding. The housing 101 is composed of upstream and downstream members 101a and 101b which are detachably connected with each other. As will be seen from FIG. 15, the central member 104 is held at the center of the housing 101 by means of four ribs 118 which extend from the housing 101.

The housing 101 is shaped such that the cross-sectional area of the main passage 102 is reduced at the inlet end 103 and progressively increased towards the downstream end. The central member 104 has a generally elongated oval form and is smooth so as to minimize resistance to air flowing in a main passage 102.

The central member 104 has an upstream portion 105. An interior 106 of the portion 105 is hollow. The portion 105 forms a cylindrical bore which defines a by-pass passage 107 by-passing the main passage 102. The by-pass passage 107 extends straight from an upstream end 108 of the portion 105 in parallel to a flow direction in the main passage 102. The outer diameter of the portion 105 of the central member 104 progressively increases towards the downstream end.

A disc-shaped cover member 109 is provided on the rear end of the upstream portion 105. The outer peripheral surface of the cover member 109 is so turned over in parallel with the flow of air in the main passage 102 that it is smoothly connected to the outer peripheral surface of the upstream portion 105.

An inlet end 103 of the housing 101 cooperates with the upstream end of the upstream portion 105 of the central member 104 to define therebetween an upstream restriction portion B. The cover member 109 of the central member 104 cooperates with the main passage 102 of the housing 101 to define therebetween a downstream restriction portion C.

Figure 16:
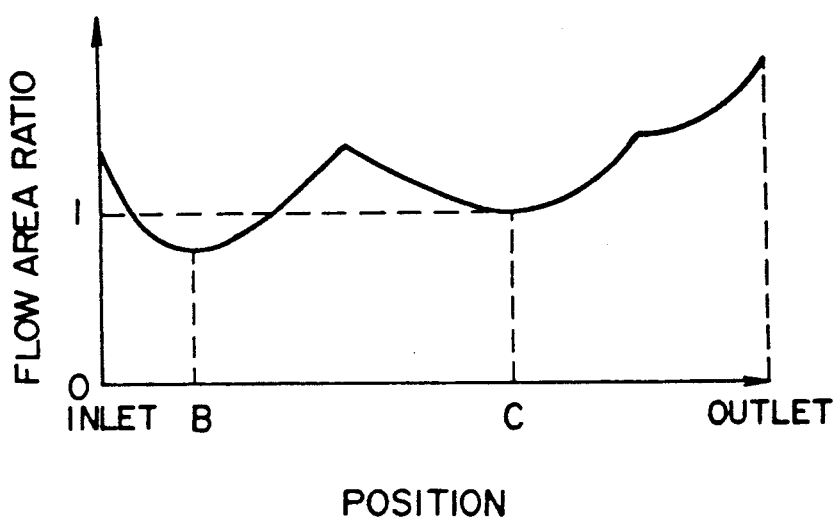
FIG. 16 is a graph illustrative of a flow area ratio in the fifth embodiment of the flowmeter.
Figure 17:
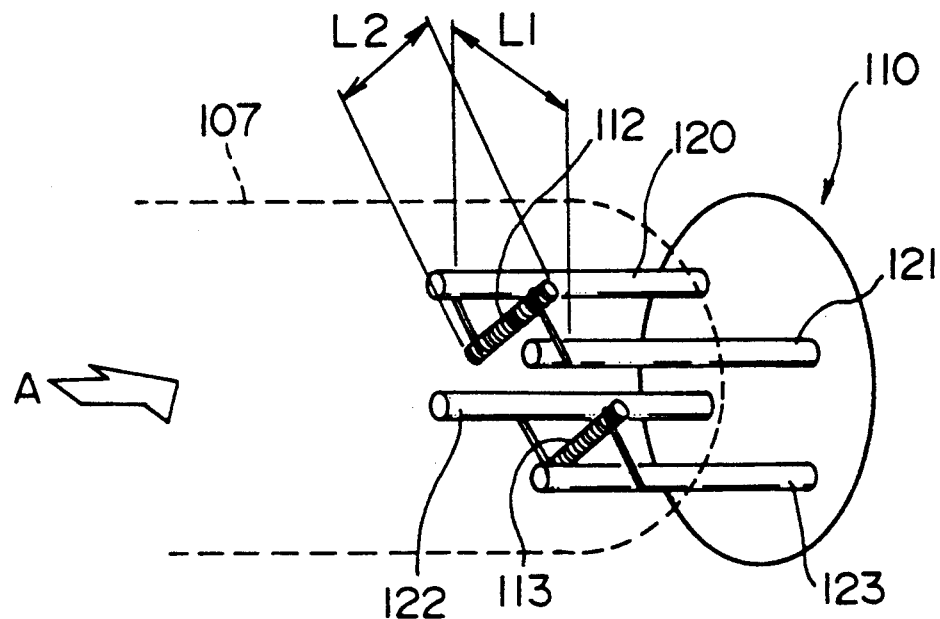
FIG. 17 is a perspective view of a structure for supporting a resistor in the fifth embodiment of the flowmeter.

FIG. 16 shows the flow area of the main passage 102 along the length of the housing between the inlet and outlet ends, normalized by the flow area at the downstream restriction portion C. Thus, the flow area of the main passage 102 is minimized at the upstream restriction portion B.

The inlet 108 of the by-pass passage 107 is Positioned upstream of the upstream restriction portion B. The central member 104 has a downstream portion 110 whose interior 111 is hollow as is the case of the upstream portion 105. The diameter of the downstream portion 110 is progressively decreased towards the downstream end. The downstream portion 110 holds a flow-velocity measuring resistor 112 and a temperature-compensation resistor 113 which are disposed in the by-pass passage 107, and accommodates a control circuit 114 which electrically controls the resistor 112, 113.

Referring to the resistors 112 and 113 are respectively supported by pairs of support pins 120, 121 and 122, 123 which extend from downstream portion 110 of the central member 104 into the by-pass passage 107.

The fifth embodiment shown in FIGS. 14 to 17 incorporates a heat-generating resistor 112 which is the same type as that used in the first embodiment. The heat-generating resistors 112 is supported by the support pins 120 and 121 such that both the pipe and two lead wires extend perpendicular to the flow A of air. Similarly, the temperature-compensation resistor 113 is supported by the support pins 122 and 123 such that both the pipe and two lead wires extend perpendicular to the flow A of air.

According to this arrangement, it is possible to use lead wires of a total length which is not smaller than the difference (L1−L2) between the spacing L1 of the support pins 120 and 121 and the axial length L2 of the pipe. The use of such long lead wires enhances the effect of heat insulation between the heat-generating resistor 112 and the support pins 120, 121, thus offering a shorter response time of the flowmeter.

As shown in FIG. 14, a radial passage 115 extending perpendicular from the by-pass passage 107 and expanding radial omnidirectionally is defined between the cover member 109 and the downstream portion 110 of the central member 104. An annular outlet passage 116 perpendicularly connected to the radial passage 115 is defined between an inner surface of the circumferential portion 109a of the cover member 109 and an outer peripheral surface of the downstream portion 110. The outlet passage 116 extends substantially in parallel with the main passage 102 and opens at an outlet end 117 towards the downstream end of the main passage 102. As will be clearly seen from FIG. 15, the outlet end 117 opens substantially over the entire circumference except the portions where ribs 118 are provided.

The operation of the fifth embodiment is as follows.

Referring to FIG. 14, atmospheric air is introduced into the hot-wire type flowmeter 100 as indicated by the arrow A through an air cleaner which is not show, so as to flow through the main passage 102.

The velocity of the air is increased since the cross-sectional area of the flow passage is restricted by the downstream restriction portion C, thereby generating a negative pressure.

The outlet end 117 of the by-pass passage 107 opens in the downstream restriction portion C so that air flows through the by-pass passage 107 due to pressure difference between the inlet end 108 and the outlet end 117 of the by-pass passage 107.

The supply of electrical power to the flow-velocity measuring resistor 112 disposed in the by-pass passage 107 is controlled by a control circuit 114 such that a predetermined temperature difference is developed between the resistor 112 and the intake air. The flow rate of the air in the by-pass 107 is measured to detect the flow rate of the intake air.

Local concentration of air flowing from the upstream side of the hot-wire type flowmeter 100 inevitably occurs due to various factors such as the presence of the air cleaner, state of mounting of the hot-wire type flowmeter 100 with respect to the air cleaner, and so forth. Such a local concentration, however, can be corrected as circumferential flow component is increased when the air passes through the upstream restriction portion B. Consequently, a substantially uniform flow velocity distribution is obtained in the circumferential direction at the downstream restriction portion C. Any local concentration of the flow of air in the downstream restriction portion C would cause a non-uniform distribution of sucking force over the entire circumference of the outlet 117, resulting in a change of the ratio of the by-passing air flow rate to the flow rate of the air in the main passage 102. In this embodiment, however, the flow rate of the air in the by-pass passage is exactly maintained at a predetermined ratio to the flow rate in the main passage 102 by virtue of the effect of the upstream restriction portion B which serves to cancel local concentration of flow of the air.

Thus, the fifth embodiment described hereinbefore offers an advantage in that any uneven circumferential distribution of negative pressure in the downstream restriction attributable to local concentration of flow of air in the main passage 102 is avoided. As a consequence, error in the measurement of air flow rate introduced into the engine is reduced because the flow rate of the air in the by-pass passage 107 is maintained correctly at a predetermined ratio to the flow rate in the main passage 102 despite any local concentration of air at the inlet end 103 of the main passage 102.

Figure 18:
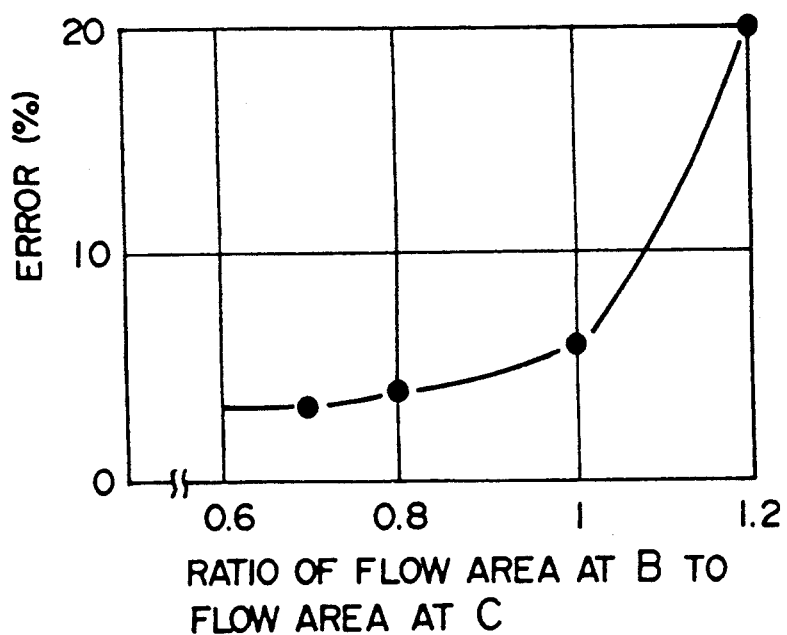
FIG. 18 is a graph showing the relationship between the air flow area ratio of a restriction portion and a flow rate measurement error in the fifth embodiment.

FIG. 18 is a graph showing amounts of error of the flow rate measured in the by-pass passage 107 from the actual flow rate for different values of the ratio of the cross-sectional area between the upstream restriction portion B and the downstream restriction portion C. Axis of abscissa represents the above-mentioned ratio, while the axis of ordinate represents the error.

As will be understood from FIG. 18, the more an error is reduced, the smaller the ratio of the cross-sectional area at the upstream restriction portion B to that at the downstream restriction portion C is made. This is because the above-mentioned effect for correcting local concentration of air flow is enhanced when the value of the cross-sectional area ratio is reduced. Conversely, the error is drastically increased when the cross-sectional area at the upstream restriction portion B is increased beyond that at the downstream restriction portion C. A too small cross-sectional area at the upstream restriction portion B, however, causes an increase in the resistance to the flowing air. In this embodiment, therefore, the above-mentioned cross-sectional area ratio is set to 0.8.

It is to be understood that the lead wires may be set at a suitable angle to the pipe, although the lead wires are connected perpendicular to the pipe in the described embodiments. The length of the lead wires can be increased provided that the lead wires are set at a suitable acute angle to the pipe.

What is claimed is:

1. A hot-wire type flowmeter for measuring the flow rate of a fluid in a fluid passage by sensing a change in an electrical resistance of an electrical resistor supported by a supporting structure within said fluid passage, wherein said electrical resistor includes:

a pipe made of an electrically insulating material;
an electrically resistor wire wound on said pipe; and lead wires extending in opposite directions from said pipe, each lead wire having one end secured to an end portion of said pipe so as to extend to intersect said pipe with respect to a longitudinal direction of said pipe and connected to said resistor wire, and having the other end supported by said supporting structure.

2. A hot-wire type flowmeter according to claim 1, wherein said lead wire extends perpendicular to the axis of said pipe.

3. A hot-wire type flowmeter according to claim 1, wherein an axis of said pipe extends perpendicular to a direction of flow of said fluid, and said lead wires extend perpendicular to the direction of flow of said fluid.

4. A hot-wire type flowmeter according to claim 1, wherein an axis of said pipe extends perpendicular to a direction of flow of said fluid, and said lead wires extend in parallel with the direction of flow of said fluid.

5. A hot-wire type flowmeter according to claim 1, wherein said supporting structure includes a pair of pins projecting into said fluid passage.

6. A hot-wire type flowmeter according to claim 5, wherein said the other end of each said head wire is supported by one of said pins.

7. A hot-wire type flowmeter according to claim 5, wherein said lead wires include:
a first lead wire, one end of which is secured to one end portion of said pipe so as to extend to cross the axis of said pipe and is electrically connected to said resistor wire, and the other end of which is supported by one of said support pins; and
a second lead wire, one end of which is secured to the other end portion of said pipe so as to extend to cross the axis of said pipe and is electrically connected to said resistor wire, and the other end of which is supplied by the other of said support pins.

8. A hot-wire type flowmeter according to claim 7, wherein said first and said second lead wires extend parallel to each other.

9. A hot-wire type flowmeter for measuring the flow rate of a fluid in a fluid passage by sensing a change in an electrical resistance of an electrical resistor supported by a supporting structure within said fluid passage, said flowmeter comprising:
a pair of support pins extending in parallel with an axis of said passage; and
an electrical resistor including a pipe made of an electrically insulating material, a resistor wire wound on said pipe, and a pair of lead wires, said resistor being supported between said support pins through said lead wires, one end of at least one of said lead wires being secured to said pipe so as to extend to intersect said pipe with respect to a longitudinal direction of said pipe, and said lead wires being electrically connected to said resistor wire.

10. A hot-wire type flowmeter according to claim 9, wherein an axis of said pipe extends perpendicular to a direction of flow of said fluid in said fluid passage.

11. A hot-wire type flowmeter according to claim 9, wherein an axis of said pipe and said air of lead wires extend perpendicular to the direction of flow of said fluid in said fluid passage.

12. A hot-wire type flowmeter according to claim 9, wherein the total length of said pair of lead wires is greater than the difference (L1-L2) between the spacing L1 of said pair of support pins and the axial length of L2 of said pipe.

13. A hot-wire type flowmeter for measuring the flow rate of a fluid in a fluid passage by sensing a change in an electrical resistance of an electrical resistor supported by a supporting structure within said fluid passage, said flowmeter comprising:
a housing defining therein a main passage through which a fluid flows;
a central member disposed substantially at the center of said main message in said housing;
a fluid inlet formed in a surface of said central member, through which said fluid is introduced from said main passage;
a flow passage restriction portion formed between said central member and said housing;
a fluid outlet formed in said central member and opening to a region near said flow passage restriction portion so as to enable said fluid taken up through said fluid inlet to be relived into said main passage;
a straight cylindrical portion formed in said central member and forming a part of a by-pass passage extending between said inlet and said outlet;
a wall portion positioned at the terminal end of said straight cylindrical portion;
a pair of support pins projecting from said wall portion towards the upstream end of said straight cylindrical portion and extending in parallel with an axis of said straight cylindrical portion; and
an electrical resistor supported between said support pins through a pair of lead wires;
said resistor including a pipe made of an electrically insulating material and a resistor wire wound on said pipe, one end of at least one of said lead wires being secured to said pipe so as to extend to intersect said pipe with respect to a longitudinal direction of said pipe, and said lead wires being electrically connected to said resistor wire.

14. A hot-wire type flowmeter according to claim 13, wherein an axis of said pipe and said pair of lead wires extend perpendicular to the direction of flow of said fluid in said fluid passage.

15. A hot-wire type flowmeter according to claim 13, wherein the total length of said pair of lead wires is greater than the difference (L1-L2) between the spacing L1 of said pair of support pins and the axial length L2 of said pipe.

* * * * *